United States Patent [19]
Ootsu

[11] 4,193,265
[45] Mar. 18, 1980

[54] TRANSDUCER FOR CONVERTING THE ENERGY OF OCEAN CURRENTS

[76] Inventor: Fumio Ootsu, 6-4, Shirahae-cho, Sasebo-shi, Nagasaki-ken, Japan, 857

[21] Appl. No.: 940,606

[22] Filed: Sep. 8, 1978

[30] Foreign Application Priority Data

Apr. 18, 1978 [JP] Japan .................................. 53/44791

[51] Int. Cl.² ............................................ F15B 11/06
[52] U.S. Cl. ........................................ 60/398; 290/54; 405/75; 417/334
[58] Field of Search ................. 60/398, 407, 408, 409, 60/413, 498, 501, 502; 290/42, 43, 53, 54; 405/75; 415/2; 417/330, 334

[56] References Cited

U.S. PATENT DOCUMENTS

| | | | |
|---|---|---|---|
| 4,071,305 | 1/1978 | Ootsu | 290/43 X |
| 4,123,185 | 10/1978 | Hagen et al. | 290/42 X |
| 4,139,984 | 2/1979 | Moody et al. | 60/398 |

*Primary Examiner*—Edgar W. Geoghegan
*Attorney, Agent, or Firm*—Eugene E. Renz, Jr.

[57] ABSTRACT

A transducer for converting the energy of ocean currents to the energy of a high-pressure fluid comprises a plurality of transducer units each including a sea-water channel, a plenum room overlying the channel, an impeller rotatably disposed in the channel and plenum room and rotatable by a sea-water flow through the channel, and a converter mechanism operatively coupled with the shaft of the impeller for producing a high-pressure fluid in response to revolution of the impeller. To prevent pressurized air in the plenum room for leaking out of the transducer unit when the transducer is joggled underwater as in stormy conditions, a pair of air-trapping chambers are located one on each side of the plenum room and open toward the channel for receiving any air which has escaped from the plenum room through the channel. Each chamber may contain a part-spherical air-trapping member that is pivotally movable into the channel upon inclination of the transducer so as to prevent the trapped air from leaking out of the air-trapping chamber.

3 Claims, 10 Drawing Figures

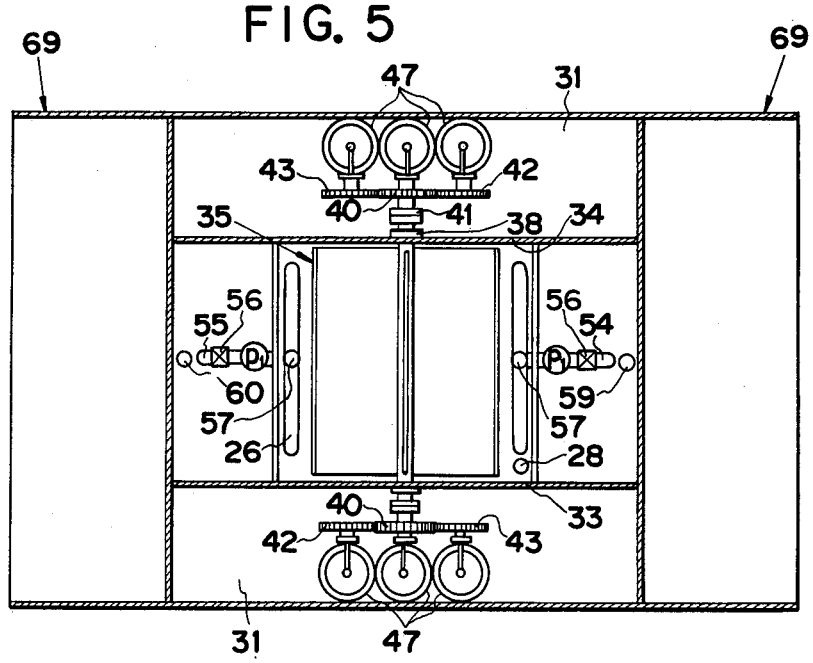
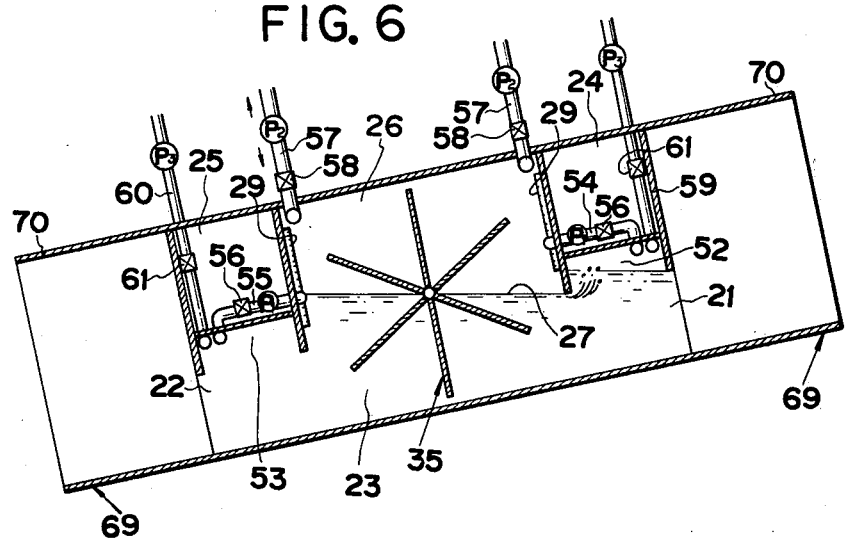

TRANSDUCER FOR CONVERTING THE ENERGY OF OCEAN CURRENTS

BACKGROUND OF THE INVENTION

1. Field of the Invention

The present invention relates to an apparatus for utilizing the energy of ocean currents and more particularly to a transducer for converting the energy of a tidal or nontidal ocean current to the energy of a high-pressure fluid or another form of energy.

2. Prior Art

In view of the fact that the earth will in several decades run out of energy resources now relied on, various attempts have been proposed to utilize other sources of nergy. One such effort is the conversion of the energy of tidal ocean currents to electric energy. I have invented a transducer apparatus for utilizing such tidal energy as disclosed and claimed in U.S. Pat. No. 4,071,305, patented on Jan. 31, 1978, the apparatus including impellers which are rotatably disposed in sea-water channels below plenum and can be propelled by the flow of a tidal current for producing a high-pressure fluid. My energy transducer was initially intended to be anchored to the bottom of the sea, but may be suspended underwater by suitable floats, as shown in FIG. 10 of the accompanying drawings, to utilize the energy of nontidal ocean currents far off shore.

Such floating transducers would be disadvantageous in that they tend to joggle or rock back and forth under storm conditions, allowing pressurized air to escape from the plenum rooms.

SUMMARY OF THE INVENTION

A pair of air-trapping chambers are disposed one on each side of and in communication with a plenum room in a housing adapted to be located underwater, each chamber opening toward a sea-water channel underlying the plenum room, whereby the chambers can receive any air that has escaped from the plenum room through the sea-water channel. There is an air reservoir communicating with the plenum room and with the air-trapping chambers, and means for controlling the communication between the plenum room and the chambers, and between the air reservoir and the plenum room when the sea-water bounding the bottom of the plenum room reaches a predetermined level.

According to another embodiment, each of the air-trapping chambers has a spherical wall, and there is a spherical air-trapping member having a radius of curvature smaller than that of the spherical wall of each chamber and normally held in the concave side of the spherical wall of each chamber, the spherical member being angularly movable in its spherical plane into the sea-water channel in response to inclination of the housing in the underwater so that leaked air received in the chambers can be effectively retained in the housing by the air-trapping members.

Accordingly, it is an object of the present invention to provide a transducer for converting the energy of ocean currents to another form of kinetic energy, the transducer including a pair of air-trapping chambers for receiving any air that has leaked out of a plenum room when the transducer is inclined.

Another object of the present invention is to provide means by which the air trapped in the air-trapping chambers can be effectively retained against leakage therefrom even when the transducer is excessively inclined in the underwater.

Many other advantages, features and additional objects of the present invention will become manifest to those versed in the art upon making reference to the detailed description and the accompanying drawings in which preferred structural embodiments incorporating the principles of the present invention are shown by way of illustrative example.

BRIEF DESCRIPTION OF THE DRAWINGS

FIG. 5 is a cross-sectional view taken along line V—V of FIG. 3;

FIG. 6 is a view similar to FIG. 3, showing the unit being inclined;

DETAILED DESCRIPTION

Figure 1:
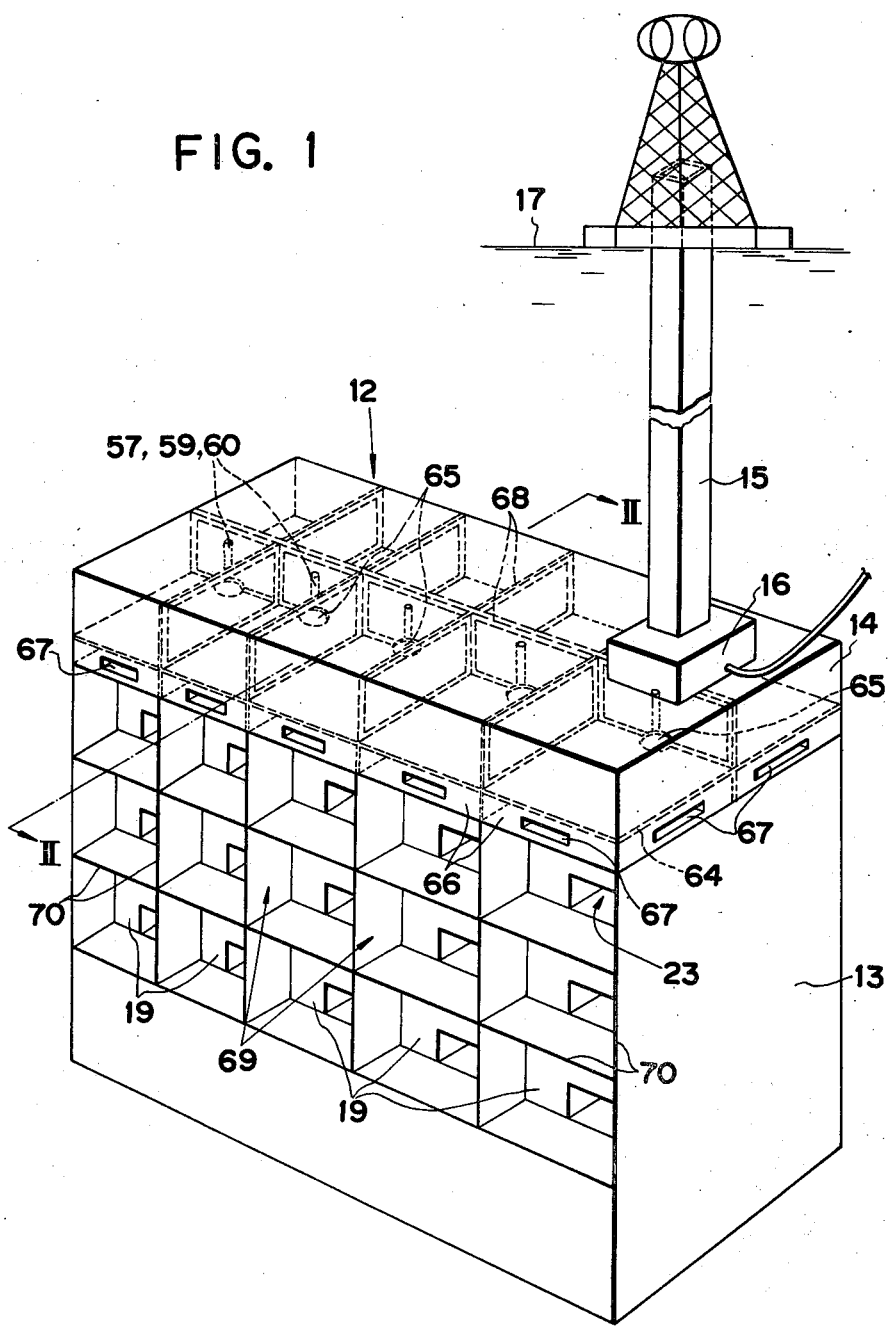
FIG. 1 is a perspective view of a transducer assembly constructed in accordance with the present invention.
Figure 2:
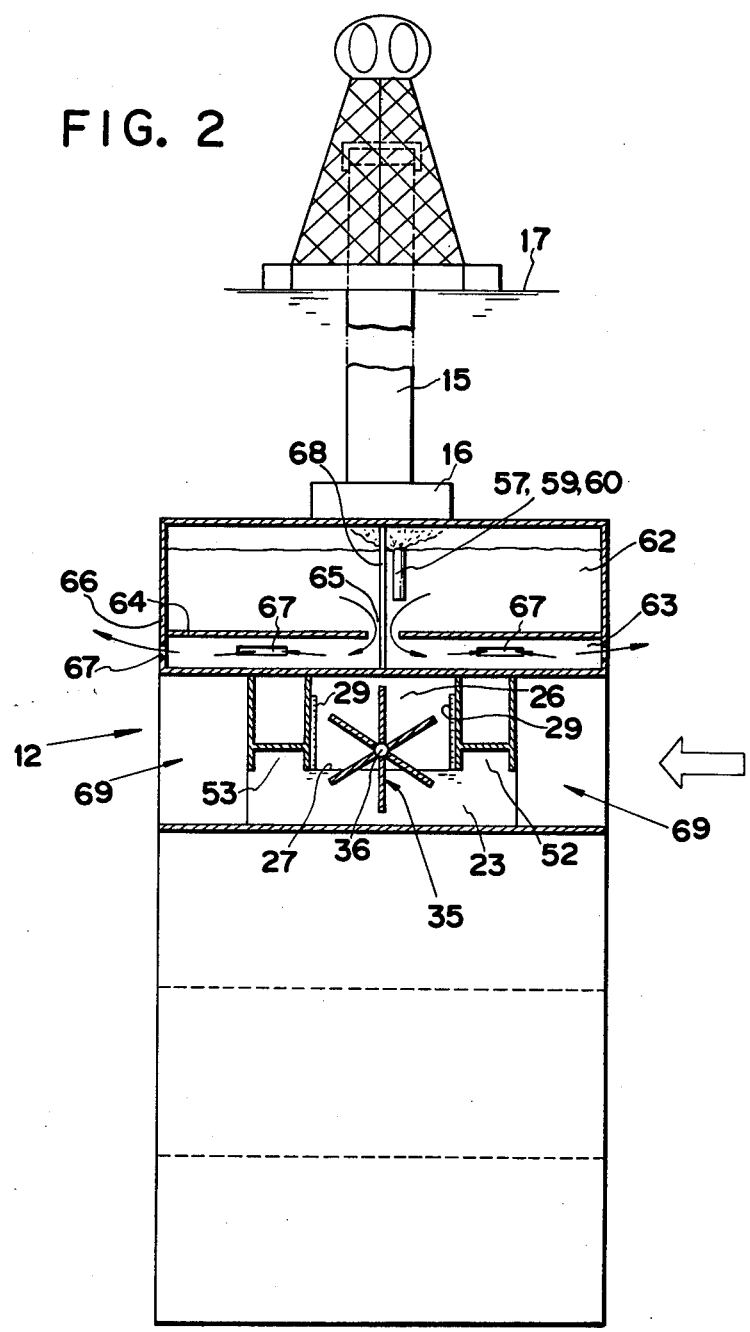
FIG. 2 is a cross-sectional view, with parts omitted for clarity, taken along line II—II of FIG. 1.
Figure 10:
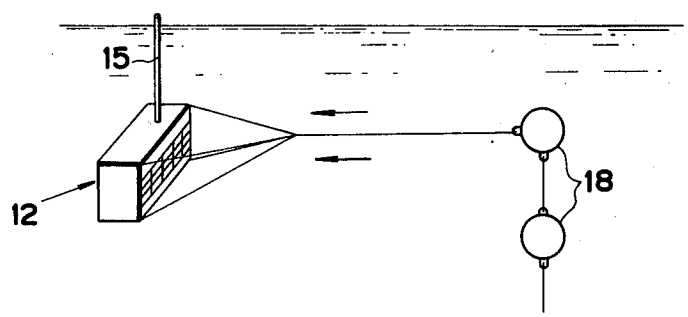
FIG. 10 is a perspective view of the transducer assembly of the invention which is suspended underwater.

The present invention is particularly useful when embodied in a transducer assembly such as schematically shown in FIGS. 1 and 2, generally indicated by the numeral 12. The transducer assembly 12 basically comprises a transducer vessel 13 in the form of a rectangular box, an emergency air reservoir 14 mounted on the top of the vessel 13, an air introduction duct 15 extending upwardly from the air reservoir 14, and a control unit 16 for controlling the operation of the transducer assembly 12 in response to command signals from a remotely located station (not shown). When in operation, the transducer assembly 12 is submerged in the sea with a top end portion of the air introduction duct 15 projecting above the surface 17 of the sea, the assembly 12 floating underwater by being coupled with floats 18 (FIG. 10).

Figure 3:
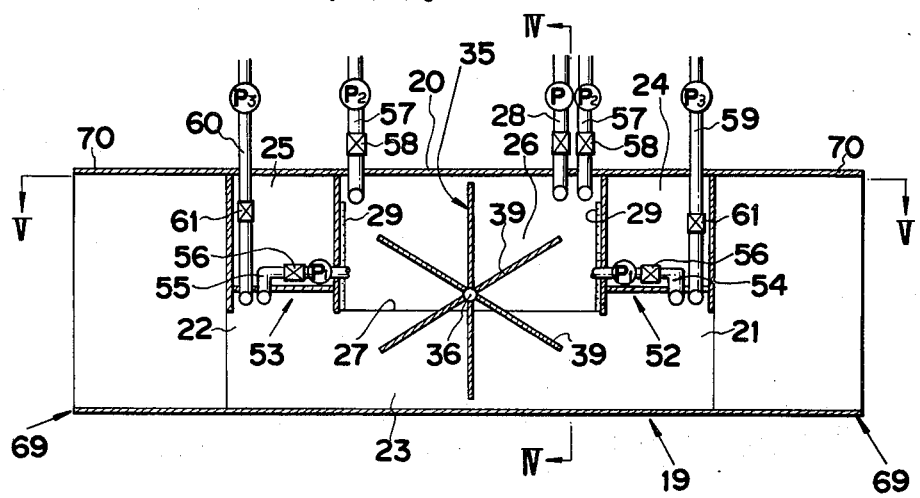
FIG. 3 is an enlarged longitudinal cross-sectional view of a transducer unit.

The transducer vessel 13 includes a plurality, in the illustrated embodiment, fifteen, of rectangular transducer units 19 arranged in three rows and five columns, each unit 19 extending transversely of the vessel 13. As best shown in FIG. 3, each of the units 19 comprises a housing 20 having a pair of oppositely disposed open ends 21, 22 between which extends a channel 23 for the passage therethrough of the flow of sea-water. The housing 20 includes a pair of spaced end compartments 24, 25 located adjacent to the open ends 21,22, respectively, and above the sea-water channel 23, and a plenum room 26 disposed between the end compartments 24, 25 and bottomed by the surface 27 of the sea-water in the channel 23. The plenum room 26 contains air under pressure supplied from the air introduction duct 15 through an air inlet pipe 28 (FIG. 4), the pressurized air in the plenum room 26 maintaing the surface 27 of the sea-water in the channel 23 at a predetermined level that is estblished by the control unit 16 through level sensors 29 in the plenum room 26.

Figure 4:
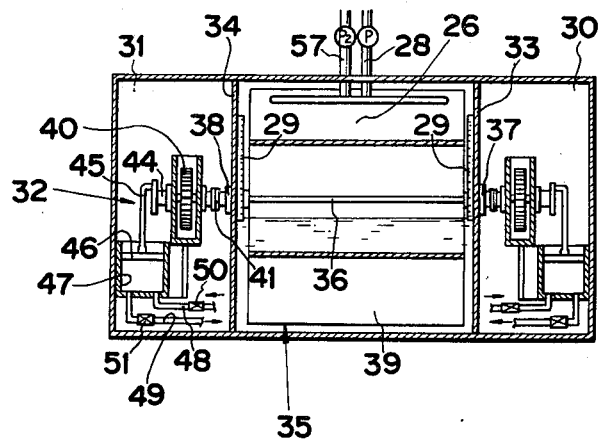
FIG. 4 is a transverse cross-sectional view taken along line IV—IV of FIG. 3.

As illustrated in FIG. 4, the housing 20 further includes a pair of spaced side compartments 30, 31 in each of which a converter mechanism 32 is disposed, the plenum room 26 and sea-water channel 23 being laterally bounded between sidewalls 33, 36 of the compartments 30, 31. A wheel or impeller 35 is rotatably located in the housing 30 and includes a drive shaft 36 having its ends rotatably journaled in hermetically sealed bearings 37, 38 mounted respectively on the sidewalls 33, 36 of the compartments 30, 31. The impeller 35 also includes a plurality of radial vanes 39 angularly spaced at uniform intervals, some of the vanes 39 being positioned in the plenum room 26 and the remainder in the channel 23 at all times so as to permit the impeller 35 to be rotated by the flow of sea-water current through the channel 23.

As shown in FIGS. 4 and 5, each converter mechanism 32 comprises a drive gear 40 coupled through a joint 41 corotatably with the end of the shaft 36 of the impeller 35 which extends into the compartment 30, 31, and a pair of driven gears 42, 43 one on each side of the drive gear 40, the gears 40, 42 and 43 having shafts 44 linked via cranks 45 to pistons 46 in air cylinders 47 for reciprocating the pistons 46 upon rotation of the gears 40, 42 and 43. The closed end of the cylinders 47 communicates with an air inlet pipe 48 connected to the air inlet duct 15 from which air is supplied, and is vented to a discharge pipe 49 through which the air pressurized in the cylinders 47 is discharged to a pressurized-air tank (not shown). The pipes 48 and 49 are equipped with check valves 50 and 51, respectively. The converter mechanism 32 may however comprise an electric generator coupled with the shaft 36 of the impeller 35.

A pair of air-trapping chambers 52, 53 as shown in FIGS. 2 and 6 are disposed beneath the end compartments 24, 25, respectively, and are located one on each side of the plenum room 26, each chamber 52, 53 opening downwardly toward the sea-water channel 23. The plenum room 26 is connected to the air-trapping chambers 52, 53 through a pair of pipes 54, 55, respectively, each including a pump p1 and a valve 56 that can be operated under the control of the control unit 16. The plenum room 26 is held in communication with the air reservoir 14 by way of a pair of pipes 57, 57 each equipped with a pump P2 and a valve 58 actuatable also from the control unit 16. Further, the air reservoir 14 communicates with the chambers 52, 53 via a pair of pipes 59, 60 each having a pump P3 and a valve 61 that are controllable also from the control unit 16.

In FIGS. 1 and 2, the air reservoir 14 includes an upper room 62 and a lower room 63 with a horizontal partition 64 interposed therebetween, the upper and lower rooms 62, 63 communicating with each other through a plurality of holes 65 in the partition 64. Outer walls 66 of the lower rooms 63 are provided with ports 67 through which sea-water is introduced into and normally maintained in the air reservoir 14. The air reservoir 14 is internally reinforced with vertical frameworks 68.

Mounted on the opposite sides of the vessel 13 are a plurality of guides 69 for guiding ocean currents to flow into the sea-water channels 23. Each of the guides 69 comprises four sidewalls 70 each extending at a right angle to adjacent sidewalls and projecting from the side of the vessel 13, the four sidewalls 70 being disposed in surrounding relation to one of the open ends 21, 22 of the sea-water channels 23. The guide 69 is coextensive in cross section with the housing 20, so that the guides 69 cover the entire area of the sides of the vessel 13. The ocean current, once flown into the guides 69, is trapped therein and prevented from escaping out of the guides 69 over the edges of the sidewalls 70 under increased pressure within the guides 69 due to continuing influx of the water flow. With the increased pressure in the guides 69, the sea water therein is forcibly fed into the sea-water channels 23 through the open ends 21 or 22 and caused to flow through the channels 23 at an increased speed. Further, the guides 69 act as a sea-water collector in the case where a direction of the sea-water flow or current varies so as to be out of alignment with the longitudinal axis of the sea-water channels 23.

The transducer assembly 12 thus constructed functions as follows: With the transducer assembly 12 submerged in the sea and facing in the direction of a tidal or nontidal current, air is introduced through the duct 15 and is compressed and fed by the control unit 16 into the plenum rooms 26 via the pipes 28, and at the same time a sea-water flow due to such ocean current enters into each of the guides 69 and is forced to go into an associaed one of the channels 23, in which the sea-water flow causes the impeller 35 to revolve and rotate its drive shaft 36. The drive shaft 36 then rotates the gear 40 and the gears 42, 43 meshing therewith, the gears 40, 42 and 43 in turn actuating the pistons 46 to reciprocate in the cylinders 47 which then produces compressed air as previously set forth. Such air under pressure is discharged via the discharge pipe 49 into the unshown pressurized-air tank, the stored air pressure being utilizable as a motive power as for the generation of electricity.

The transducer assembly 12 can normally operate to supply pressurized air as long as the sea is comparatively calm. When the sea gets rough under storm conditions, the transducer assembly 12 is rocked back and forth as illustrated in FIG. 6, whereupon the air under pressure in the plenum room 26 tends to escape therefrom outwardly through the channel 23. However, such leaking air is trapped and received in the air-trapping chambers 52, 53 and thus is effectively prevented from leaking out of the housing 20. As the air received in the chambers 52, 53 builds up in quantity, the control unit 16 opens the valves 61 and actuates the pumps P3 to permit such air to go up into the air reservoir 14. When the sea becomes quiet again, and the assembly 12 is restored back into its proper posture, the surface 27 of the sea-water in the channel 23 is brought to a predetermined level, which is then detected jointly by the level sensors 29, 29 whereupon the control unit 16 opens the valves 56 and operates the pumps P1, returning the trapped air in the chambers 52, 53 to the plenum room 26 through the pipes 54, 55.

During normal operation when the assembly 12 is held stationarily, the impeller 35 could be rotated quite fast due to an increased speed of the water flow through the channel 23, in which instance some air in the plenum room 26 is liable to be taken away by the impeller vanes 39 as bubbles into the channel 23. However, such air bubbles are also caught by one or both of the air-trapping chambers 52, 53.

When the transducer assembly 12 is joggled or tilted excessively during heavy storms, it is possible that the chambers 52, 53 cannot completely trap the air escaping from the plenum room 26. To provide against such conditions, the level sensors 29, 29 are energizable when the surface 27 of the water flow in the channel 23 is inclined at a predetermined angle (20 degrees, for example) with respect to the horizontal plane of the housing 20, the control unit 16 being actuatable upon energization of the sensors 29 so as to open the valves 58, 58 and operate the pumps P2 thereby allowing the compressed air in the plenum room 26 to go upwardly into the air reservoir 14. The pressurized air is thus stored in the reservoir 14 instead of leaking from the apparatus during stormy weather. Reserving the pressurized air in the reservoir 14 positioned in upper part of the assembly 12 is also advantageous in that since the center of gravity of the assembly 12 is then lowered, the assembly 12 becomes stabilized in posture. Further, a predetermined degree of buoyancy of the assembly 12 can be retained.

Figure 7:
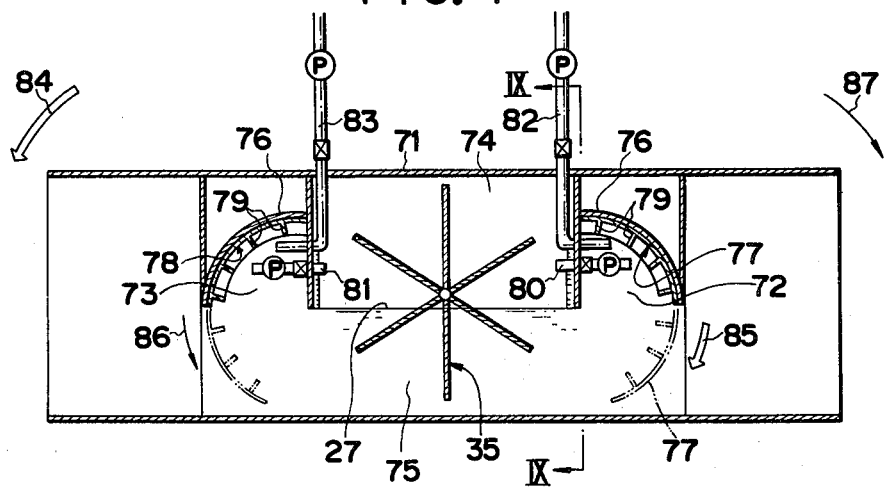
FIG. 7 is an enlarged longitudinal cross-sectional view of a transducer unit provided according to another embodiment.
Figure 8:
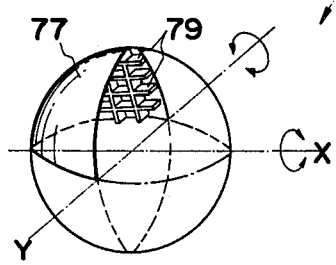
FIG. 8 is a perspective view of an air-trapping member used in the unit illustrated in FIG. 7.

According to another embodiment shown in FIG. 7, a transducer unit housing 71 has a pair of air-trapping chambers 72, 73 one on each side of a plenum room 74 that overlies a sea-water channel 75 extending through the housing 71. Each of the chambers 72, 73 includes a spherical wall 76 with its concave side facing the interior of the chambers 72, 73, the spherical wall 76 preferably comprising one quarter of the surface of a sphere. A pair of air-trapping spherical members 77, 78 are normally held as by springs in the concave side of the walls 76, 76, respectively, each member 77, 78 preferably comprising one quarter of a spherical surface having a radius of curvature smaller than that of the spherical wall 76 of one of the chambers 72, 73. As best shown in FIG. 8, a multiplicity of blades 79 project inwardly from the concave side of each member 77, 78. Each member 77, 78 is supported on the unit housing 71 by any suitable means such as a gimbal, so that the member 77, 78 can move in its spherical plane about both the axes of X and Y. The chambers 72, 73 are held in communication with the plenum room 74 through a pair of valved pipes 80, 81, respectively, and with an air reservoir (not shown) through a pair of valved pipes 82, 83, respectively.

Figure 9:
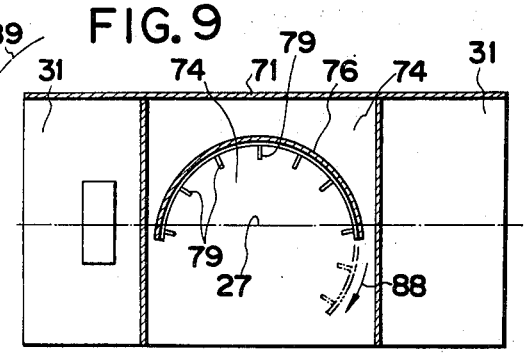
FIG. 9 is a transverse cross-sectional view taken along line IX—IX of FIG. 7.

When the transducer unit housing 71 is tilted in the direction of the arrow 84 (FIG. 7), one of the air-trapping members 77 is angularly moved downwardly into the channel 75 in the direction of the arrow 85, and at the same time air under pressure in the plenum room 74 leaks through the channel 75 into the chamber 72. As such leaked air builds up in the chamber 72, it acts on the blades 79 of the member 77 and retains the member 77 in a lowered position as illustrated by the imaginary lines. Conversely, the air-trapping member 78 is pivoted in the direction of the arrow 86 downwardly into a lowered position in the channel 75 when the housing 71 is tilted in the direction of the arrow 87, and the member 78 is held in that lowered position due to leaked air accummulated in the chamber 73. With the air-trapping member 77 or 78 thus depressed, the air in the chamber 72 or 73 can be reliably prevented from getting out of the housing 71 even if rocking movement of the housing 71 is excessive. FIG. 9 shows one of the air-trapping members 77 that is tiltable laterally in the direction of the arrow 88 in response to lateral inclination of the housing 71 in the direction of the arrow 89.

The valved pipes 80, 81 allow the trapped air in the chambers 72, 73 to return to the plenum room 74 when the housing 71 stops tilting. When the air in the chambers 72, 73 reaches a predetermined amount, such air is brought upwardly into the air reservoir through the valved pipes 82, 83.

Although various minor modifications might be suggested by those versed in the art, it should be understood that I wish to embody within the scope of the patent warranted hereon, all such embodiments as resonably and properly come within the scope of my contribution to the art as set forth in the claims which follow.

I claim as my invention:

1. A transducer for converting the energy of an ocean current to another form of energy, comprising:
   (a) a housing having a pair of opposed open ends and adapted to be placed underwater;
   (b) a channel extending between said open ends for allowing sea-water to flow therethrough;
   (c) a plenum room disposed in said housing and overlying said channel, said plenum room being bottomed by the sea-water in said channel;
   (d) an impeller including a drive shaft rotatably supported by said housing, said impeller being disposed partly in said plenum room and partly in said channel whereby said impeller can be rotated by the flow of sea-water through said channel;
   (e) means operatively coupled with said drive shaft for producing energy in response to rotation of said impeller;
   (f) a pair of air-trapping chambers disposed in said housing and located one on each side of and in communication with said plenum room, each of said chambers opening toward said channel whereby said chambers can receive any air that has escaped from said plenum room through said channel;
   (g) an air reservoir communicating with said plenum room; and
   (h) means for controlling the commnication between said plenum room and said chambers and between said air reservoir and said plenum room when the sea-water at the bottom of said plenum room reaches a predetermined level.

2. A transducer according to claim 1, including piping extending between said plenum room and said chambers and between said air reservoir and said plenum room, said controlling means including a plurality of valves in said piping.

3. A transducer according to claim 1, each of said chambers having a spherical wall, further including a pair of spherical air-trapping members each having a radius of curvature smaller than that of one of the spherical walls and normally held in the concave side of the spherical wall, said spherical members being angularly movable in its spherical plane into said channel in response to inclination of said housing in the underwater so that air received in said chambers can be retained by said members against escape from said housing.

* * * * *